(12) United States Patent
Valdes et al.

(10) Patent No.: US 7,398,210 B2
(45) Date of Patent: Jul. 8, 2008

(54) SYSTEM AND METHOD FOR PERFORMING ANALYSIS ON WORD VARIANTS

(75) Inventors: Rene J. Valdes, Kirkland, WA (US); Maria del Mar Gines Marin, Kirkland, WA (US); Kevin R. Powell, Kirkland, WA (US); Andrea Maria Jessee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 716 days.

(21) Appl. No.: 10/804,883

(22) Filed: Mar. 19, 2004

(65) Prior Publication Data

US 2005/0091033 A1 Apr. 28, 2005

Related U.S. Application Data

(60) Provisional application No. 60/513,921, filed on Oct. 23, 2003.

(51) Int. Cl.
*G06F 17/27* (2006.01)
*G10L 15/18* (2006.01)
*G10L 15/28* (2006.01)

(52) U.S. Cl. ............................. 704/257; 704/9; 704/255
(58) Field of Classification Search .................. 704/257
See application file for complete search history.

(56) References Cited

U.S. PATENT DOCUMENTS

| 4,384,329 A | 5/1983 | Rosenbaum et al. |
| 4,688,192 A | 8/1987 | Yoshimura et al. |
| 4,703,425 A | 10/1987 | Muraki |

(Continued)

FOREIGN PATENT DOCUMENTS

EP  0 539 965 A2  5/1993

(Continued)

OTHER PUBLICATIONS

Goni et al., 'ARIES: A lexical platform for engineering Spanish processing tools', Natural Language Engineering 3(4), p. 317-345, Cambridge University Press, 1997.*

(Continued)

*Primary Examiner*—David Hudspeth
*Assistant Examiner*—Justin W. Rider
(74) *Attorney, Agent, or Firm*—John D. Veldhuis-Kroeze; Westman, Champlin & Kelly, P.A.

(57) ABSTRACT

A computer-readable medium stores a first lexicon data structure for lexicon words. The first data structure includes a host form variant field containing a host form variant such as a clitic host form variant, a host form field containing the host form of the host form variant (only present if the forms differ) such as a clitic host verbal form, and a verification field indicative of whether the host form variant is a valid word. The first data structure also includes a segment association field containing data or segmentation bits associating the host form variant with certain types of attachment entries in the lexicon, which also contain data or segmentation bits, to define valid combinations between the host form variant and at least one of the attachment entries in the lexicon. A second lexicon data structure for each of the attachment entries in the lexicon is also stored.

6 Claims, 11 Drawing Sheets

U.S. PATENT DOCUMENTS

| | | | |
|---|---|---|---|
| 4,724,523 | A | 2/1988 | Kucera |
| 4,736,296 | A | 4/1988 | Katayama et al. |
| 4,771,385 | A | 9/1988 | Egami et al. |
| 4,868,750 | A * | 9/1989 | Kucera et al. .................. 704/8 |
| 4,887,212 | A | 12/1989 | Zamora et al. |
| 4,991,135 | A | 2/1991 | Yoshimura et al. |
| 5,056,021 | A | 10/1991 | Ausborn |
| 5,289,376 | A | 2/1994 | Yokogawa |
| 5,611,076 | A | 3/1997 | Durflinger et al. |
| 5,642,522 | A | 6/1997 | Zaenen et al. |
| 5,708,829 | A | 1/1998 | Kadashevich et al. |
| 6,708,829 | B2 | 1/1998 | Kadashevich et al. |
| 5,715,468 | A | 2/1998 | Budzinski |
| 5,761,688 | A | 6/1998 | Morishita |
| 5,789,057 | A | 8/1998 | Naitou et al. |
| 5,799,268 | A | 8/1998 | Boguraev ..................... 704/9 |
| 5,867,812 | A | 2/1999 | Sassano |
| 5,995,922 | A | 11/1999 | Penteroudakis et al. |
| 5,995,992 | A | 11/1999 | Ekard |
| 6,021,409 | A | 2/2000 | Burrows |
| 6,081,774 | A | 6/2000 | De Hita et al. |
| 6,138,087 | A | 10/2000 | Budzinski |
| 6,278,967 | B1 | 8/2001 | Akers et al. |
| 6,278,968 | B1 | 8/2001 | Franz et al. ..................... 704/3 |
| 6,298,321 | B1 | 10/2001 | Karlov et al. |
| 6,393,389 | B1 | 5/2002 | Chanod et al. |
| 6,675,169 | B1 | 1/2004 | Bennett et al. |
| 6,735,559 | B1 | 5/2004 | Takazawa |
| 6,760,695 | B1 | 7/2004 | Kuno et al. |
| 6,792,418 | B1 | 9/2004 | Binnig et al. |
| 6,965,858 | B2 | 11/2005 | Kempe |
| 2003/0204392 | A1 | 10/2003 | Finnigan |
| 2003/0233235 | A1 * | 12/2003 | Park .......................... 704/257 |
| 2005/0091030 | A1 | 4/2005 | Jessee |
| 2005/0091031 | A1 | 4/2005 | Powell |

FOREIGN PATENT DOCUMENTS

| | | |
|---|---|---|
| WO | WO 99/50829 | 10/1999 |

OTHER PUBLICATIONS

Grimshaw, Jane. 'Optimal Clitic Positions and the Lexicon in Romance Clitic Systems', Rutgers University. Oct. 1999, http://roa.rutgers.edu/files/374-0100/374-0100-GRIMSHAW-0-0.PDF.*

Boguraev et al., B., "A Multi-Purpose Interface to an On-line Dictionary", European Chapter Meeting of the ACL, Proceedings of the third conference on European chapter of the Association for Computational Linguistics, pp. 63-69, Apr. 1987.

Fredkin, E., "Trie Memory" Communications of the Association for Computing Machinery, vol. 3, No. 9, pp. 490-499, Sep. 1960.

Nagao et al., M., "An Attempt to Computerized Dictionary Data Bases", International Conference On Computational Linguistics, Proceedings of the 8th conference on Computational Linguistics, pp. 534-542, Sep.-Oct. 1980.

Ntoulas et al., A., "Use of a Morphosyntactic Lexicon as the Basis for the Implementation of the Greek Wordnet" Lecture Notes in Computer Science, proceedings of Natural Language Processing—NLP 2000: Second International Conference, published by Springer Berlin / Heidelberg, pp. 49-56, Jun. 2000.

Wells et al., C. J., "Fast Dictionary Look-up for Contextual Word Recognition", Pattern Recognition, vol. 23, No. 5, pp. 501-508, Jun. 1990.

Zweigenbaum et al., P., "Towards a Unified Medical Lexicon for French", In Studies in Health Technology and Informatics. Medical Informatics Europe; The New Navigators: from Professionals to Patients, vol. 95, pp. 415-420, 2003.

Hedlund et al., T., "Utaclir @ CLEF 2001—Effects of Compound Splitting and N-Gram Techniques", CLEF 2001 LNCS 2406, pp. 118-136, 2002.

Koehn et al., P., "Empirical Methods for Compound Splitting", EAC: 2003, 11th Conference of the European Chapter of the Association for Computational Linguistics 2003, pp. 187-194, http://www.isi.edu/~koehn/publications/compound2003.pdf.

Crabbe et al., B., "Lexical Classes for Structuring the Lexicon of a Tag", Proceedings of the European Summer School on Logic, Language and Information 2003, http://www.loria,fr/~crabbe/doc/lexclasses.pdf.

Chang et al., E., "Induction of Classification from Lexicon Expansion: Assigning Domain Tags to WordNet Entries", Proceedings of the First International WordNet Conference, pp. 155-164, Jan. 2002.

Bodik et al., P., "Formation of a Common Spatial Lexicon and its Change in a Community of Moving Agents", Frontiers in AI: Proceedings of Scandinavian Conference on Artificial Intelligence—SCAI 2003, http://www.cs.berkeley.edu/~bodikp/publications/scai03.pdf.

Branco et al., A., "Tokenization of Portuguese: resolving the hard cases", Technical Report TR-2003-4, Department of Informatics, University of Lisbon, Mar. 2003.

Rayner et al., M., "Adapting the Core Language Engine to French and Spanish", Technical Report CRC-061, Processings NLP-IA, Moncton, New Brunswick, May 10, 1996.

Bleam, T., "(Non-) Parallels between Double Object Constructions and Spanish IO Clitic-doubling", Paper presented at LSRL 31, Chicago, Apr. 22, 2001.

Sánchez León, F., "Spanish tagset for the CRATER project", CRATER Internal Document, Mar. 7, 1994.

Habash, N., "Matador: A Large-Scale Spanish-English GHMT System", http://www.amtaweb.org/summit/MTSummit/FinalPapers/84-Habash-final.pdf, at least by Feb. 4, 2004.

Gôni et al., J., "A framework for lexical representation", AI95: Fifteenth International Conference. Language Engineering, Montpellier, Francia, pp. 243-252, Jun. 1995.

Marimon, M., "Integrating Shallow Linguistic Processing into a Unification-based Spanish Grammar", presented at COLING 2002: The 17th International Conference on Computational Linguistics, Aug. 29, 2002.

Palomar et al., M., "An Algorithm for Anaphora Resolution in Spanish Texts", Computational Linguistics, vol. 27, No. 4, pp. 546-567, Mar. 2001.

Bozsahin et al., H., "A Categorical Framework for Composition in Multiple Linguistic Domains", In Proceedings of the 4th International Conference on Cognitive Science of NLP, Dublin, CSNLP'95, Jul. 1995.

Giguet et al., E., "From Part of Speech Tagging to Memory-based Deep Syntactic Analysis", In Proceedings of the International Workshop on Parsing Technologies, (IWPT'97), pp. 77-88, MIT, Boston, Massachusetts, USA, Sep. 17-20, 1997.

Verity Internationalization "Enabling E-business in Multiple Languages" Jun. 2001.

* cited by examiner

TABLE 1

|  | Singular | Plural |
|---|---|---|
| 1st person | me | nos |
| 2nd person | te se | os se |
| 3rd person | se lo la le | se los las les |

FIG. 4

TABLE 2

|  | me | te | lo | la | le | nos | os | los | las | les |
|---|---|---|---|---|---|---|---|---|---|---|
| me | - | - | melo | mela | mele | - | - | melos | melas | meles |
| te | teme | - | telo | tela | tele | tenos | - | telos | telas | teles |
| se | seme | sete | selo | sela | sele | senos | seos | selos | selas | seles |
| nos | - | - | noslo | nosla | nosle | - | - | noslos | noslas | nosles |
| os | - | - | oslo | osla | osle | - | - | oslos | oslas | osles |

FIG. 5

TABLE 3

| Verbal form | Clitic Host Variant | me | te | se | nos | os | lo | la | le | los | las | les |
|---|---|---|---|---|---|---|---|---|---|---|---|---|
| Infin | peinar | me | te | se | nos | os | lo | la | le | los | las | les |
| Gerund | peinándo | me | te | se | nos | os | lo | la | le | los | las | les |
| P2 Sing | péina | me | te |  | nos |  | lo | la | le | los | las | les |
| P2 Pol Sing Plur | péine/péinen | me |  | se | nos |  | lo | la | le | los | las | les |
| P1 Plur | peinémos |  | te |  |  |  | lo | la | le | los | las | les |
| P1 Plur | peinémo |  |  |  | nos |  |  |  |  |  |  |  |
| P2 Plur | peinad | me |  |  | nos |  | lo | la | le | los | las | les |
| P2 Plur | peina |  |  |  |  | os |  |  |  |  |  |  |

FIG. 6

TABLE 4

| | Verbal form | Clitic Host Variant | -me | -te | -lo | -la | -le | -nos | -os | -los | -las | -les |
|---|---|---|---|---|---|---|---|---|---|---|---|---|
| me- | Infin | peinár | - | - | melo | mela | mele | - | - | melos | melas | meles |
| | Gerund | peinándo | - | - | melo | mela | mele | - | - | melos | melas | meles |
| | P2 Sing | péina | - | - | melo | mela | mele | - | - | melos | melas | meles |
| | P2 Pol Sg / Pl | péine/péinen | - | - | melo | mela | mele | - | - | melos | melas | meles |
| | P2 Plur | peinád | - | - | melo | mela | mele | - | - | melos | melas | meles |
| te- | Infin | peinár | teme | - | telo | tela | tele | tenos | - | telos | telas | teles |
| | Gerund | peinándo | teme | - | telo | tela | tele | tenos | - | telos | telas | teles |
| | P2 Sing | péina | teme | - | telo | tela | tele | tenos | - | telos | telas | teles |
| | P1 Plur | peinémos | - | - | telo | tela | tele | - | - | telos | telas | teles |
| se- | Infin | peinár | seme | sete | selo | sela | sele | senos | seos | selos | selas | seles |
| | Gerund | peinándo | seme | sete | selo | sela | sele | senos | seos | selos | selas | seles |
| | P2 Sing | péina | - | - | selo | sela | - | - | - | selos | selas | - |
| | P2 Pol Sg / Pl | péine/péinen | seme | - | selo | sela | sele | senos | - | selos | selas | seles |
| | P1 Plur | peinémo | - | - | selo | sela | - | - | - | selos | selas | - |
| | P2 Plur | peinád | - | - | selo | sela | - | - | - | selos | selas | - |
| nos- | Infin | peinár | - | - | noslo | nosla | nosle | - | - | noslos | noslas | nosles |
| | Gerund | peinándo | - | - | noslo | nosla | nosle | - | - | noslos | noslas | nosles |
| | P2 Sing | péina | - | - | noslo | nosla | nosle | - | - | noslos | noslas | nosles |
| | P2 Pol Sg / Pl | péine/péinen | - | - | noslo | nosla | nosle | - | - | noslos | noslas | nosles |
| | P1 Plur | peinémo | - | - | noslo | nosla | nosle | - | - | noslos | noslas | nosles |
| | P2 Plur | peinád | - | - | noslo | nosla | nosle | - | - | noslos | noslas | nosles |
| os- | Infin | peinár | - | - | oslo | osla | osle | - | - | oslos | oslas | osles |
| | Gerund | peinándo | - | - | oslo | osla | osle | - | - | oslos | oslas | osles |
| | P2 Plur | peiná | - | - | oslo | osla | osle | - | - | oslos | oslas | osles |

FIG. 7

TABLE 5

| Bit class | Seg | Applies to... |
|---|---|---|
| Clitic class | Seg1 | ... Infinitive and Gerund host form variants *cantar* and *cantándo* and single clitics that combine with them (all single clitics) |
| | Seg2 | ... Infinitive and Gerund host form variants *cantár* and *cantándo* and clitic pairs that combine with them (all clitic pairs) |
| | Seg4 | ... Imperative P2 Sing host form variant *cánta* and clitics that combine with it |
| | Seg5 | ... Imperative P2 Polite Sing & Plur host form variants *cánte* and *cánten* and clitics that combine with them |
| | Seg6 | ... Imperative P1 Plur host form variant *cantémos* and clitics that combine with it |
| | Seg7 | ... Imperative P1 Plur host form variant *cantémo* and clitics that combine with it |
| | Seg8 | ... Imperative P2 Plur host form variant *cantad* and clitics that combine with it |
| | Seg9* | ... Imperative P2 Plur host form variant *canta* and clitics that combine with it |
| | Seg10 | ... Imperative P2 Plur host form variant *cantád* and clitics that combine with it |
| | Seg11 | ... Imperative P2 Plur host form variant *cantá* and clitics that combine with it |
| Final Segment | Seg3 | ... segments that can only appear in final position (all clitics) |
| DoNotVerify | DoNotVerify | ... segments that can't appear alone |

FIG. 8

TABLE 6

| Clitic form | 1-2 | 4 | 5 | 6 | 7 | 8 | 9 | 10 | 11 | End |
|---|---|---|---|---|---|---|---|---|---|---|
| lo, la, le, los, las, les | Seg1 | Seg4 | Seg5 | Seg6 | | Seg8 | | | | Seg3 |
| me | Seg1 | Seg4 | Seg5 | | | Seg8 | | | | Seg3 |
| melo, mela, mele, melos, melas, meles | Seg2 | Seg4 | Seg5 | | | | | Seg10 | | Seg3 |
| te | Seg1 | Seg4 | | Seg6 | | | | | | Seg3 |
| telo, tela, tele, telos, telas, teles | Seg2 | Seg4 | | Seg6 | | | | | | Seg3 |
| teme, tenos | Seg2 | Seg4 | | | | | | | | Seg3 |
| nos | Seg1 | Seg4 | Seg5 | | Seg7 | Seg8 | | | | Seg3 |
| noslo, nosla, nosle, noslos, noslas, nosles | Seg2 | Seg4 | Seg5 | | Seg7 | | | Seg10 | | Seg3 |
| se | Seg1 | | Seg5 | | | | | | | Seg3 |
| selo, sela, selos, selas | Seg2 | Seg4 | Seg5 | | Seg7 | | | Seg10 | | Seg3 |
| seme, sele, senos, seles | Seg2 | | Seg5 | | | | | | | Seg3 |
| sete, seos | Seg2 | | | | | | | | | Seg3 |
| os | Seg1 | | | | | | Seg9* | | | Seg3 |
| oslo, osla, osle, oslos, oslas, osles | Seg2 | | | | | | | | Seg11 | Seg3 |

FIG. 9

TABLE 7

| Verbal form | Host form | Host variant | Seg Bits | Seg Bits | DoNot Verify |
|---|---|---|---|---|---|
| Infin | cantar | cantar | Seg1 | | |
| | | cantár | | Seg2 | DoNot |
| | comer | comer | Seg1 | | |
| | | comér | | Seg2 | DoNot |
| | vivir | vivir | Seg1 | | |
| | | vivír | | Seg2 | DoNot |
| | reír | reír | Seg1 | Seg2 | |
| Gerund | cantando | cantándo | Seg1 | Seg2 | DoNot |
| | comiendo | comiéndo | Seg1 | Seg2 | DoNot |
| | viviendo | viviéndo | Seg1 | Seg2 | DoNot |
| | riendo | riéndo | Seg1 | Seg2 | DoNot |
| Imper P2 Sing | canta | cánta | Seg4 | | DoNot |
| | come | cóme | Seg4 | | DoNot |
| | vive | víve | Seg4 | | DoNot |
| | ríe | ríe | Seg4 | | |
| Imper P2 Pol Sing | cante | cánte | Seg5 | | DoNot |
| | coma | cóma | Seg5 | | DoNot |
| | viva | víva | Seg5 | | DoNot |
| | ría | ría | Seg5 | | |
| Imper P2 Pol Plur | canten | cánten | Seg5 | | DoNot |
| | coman | cóman | Seg5 | | DoNot |
| | vivan | vívan | Seg5 | | DoNot |
| | rían | rían | Seg5 | | |

| Verbal form | Host form | Host variant | Seg Bits | Seg Bits | DoNot Verify |
|---|---|---|---|---|---|
| Imper P1 Plur | cantemos | cantémos | Seg6 | | DoNot |
| | | cantémo | Seg7 | | DoNot |
| | comamos | comámos | Seg6 | | DoNot |
| | | comámo | Seg7 | | DoNot |
| | vivamos | vivámos | Seg6 | | DoNot |
| | | vivámo | Seg7 | | DoNot |
| | riamos | riámos | Seg6 | | DoNot |
| | | riámo | Seg7 | | DoNot |
| Imper P2 Plur | cantad | cantad | Seg8 | | |
| | | canta* | Seg9 | | |
| | | cantád | Seg10 | | DoNot |
| | | cantá | Seg11 | | DoNot |
| | comed | comed | Seg8 | | |
| | | come* | Seg9 | | |
| | | coméd | Seg10 | | DoNot |
| | | comé | Seg11 | | DoNot |
| | vivid | vivid | Seg8 | | |
| | | viví* | Seg9 | Seg11 | |
| | | vivíd | Seg10 | | DoNot |
| | reíd | reíd | Seg8 | Seg10 | |
| | | reí* | Seg9 | Seg11 | |

FIG. 10

SYSTEM AND METHOD FOR PERFORMING ANALYSIS ON WORD VARIANTS

The present application is based on and claims the benefit of U.S. provisional patent application Ser. No. 60/513,921, filed Oct. 23, 2003, the content of which is hereby incorporated by reference in its entirety.

CROSS-REFERENCE TO RELATED APPLICATIONS

Reference is hereby made to the following co-pending and commonly assigned patent applications. U.S. application Ser. No. 10/804,930, filed on Mar. 19, 2004, entitled "COMPOUND WORD BREAKER AND SPELL CHECKER" and U.S. application Ser. No. 10/804,998, filed Mar. 19, 2004, entitled "FULL-FORM LEXICON WITH TAGGED DATA AND METHODS OF CONSTRUCTING AND USING THE SAME", both of which are incorporated by reference in their entirety.

BACKGROUND OF THE INVENTION

The present invention is related to natural language processing. More particularly, the present invention is related to natural language systems and methods for processing words and associated word-variant forms, such as verb-clitic forms, in one of a range of languages, for example Spanish, when they are encountered in a textual input.

Numerous natural language processing applications rely upon a lexicon for operation. Such applications include word breaking (for search engines), grammar checking, spell checking, handwriting recognition and speech recognition, machine translation, text mining, etc. In some languages, the large number of possible word-variant forms makes it difficult for these natural language applications to accurately analyze the words in their various forms. Word-variant forms (or simply word forms) include compound words, clitics, inflections etc. The large number of word forms makes it difficult to include all of the word forms in the lexicon. A lexicon which contains all of these possible variations, inflections, compounds, etc. of a language is referred to as a full form lexicon.

One example of a large number of word-variant forms in a language is verb-clitic attachment in Spanish. In Spanish, clitics (unstressed forms of the personal pronouns) have different behavior depending on whether they appear before or after the verb. Clitics can precede many verbal forms. In this case, they are detached: e.g. lo vi 'I saw it'; se la entregué 'I gave it to him/her'. However, when one or more clitics appear after the verb, they are attached to it forming a single word (e.g. verlo 'to see it'; entregándosela 'giving it to him/her'). These strings are referred to herein as "verb-clitic" forms. Other languages use hyphens to attach clitics (French: donnez-moi 'give me'; Portuguese: mandá-las 'to send them') or hyphens and apostrophes (Catalan: enviar-te'l 'to send it to you'). In Spanish, clitics are attached directly to the verbal form.

Clitic attachment may or may not cause changes in the verbal form. Here are examples of the possible cases:
no change:
   comer -> comerlo 'to eat -> to eat it'
   decid -> decidme 'tell -> tell me'
addition of accent mark:
   toma -> tómalo 'take -> take it'
   pon ->póntela 'put ->put it on'
deletion of final consonant:
   mirad -> miraos 'look -> look at yourselves'
   freid ->freíos 'fry ->fry yourselves'
addition of accent mark and deletion of final consonant:
   presentad -> presentáosles 'introduce -> introduce yourselves to them'
   digamos -> digámoselo 'let's say -> let's say it to him/her'
   peinemos -> peinémonos 'let's comb -> let's comb ourselves'
deletion of accent mark:
   propón -> proponlo 'propose -> propose it'

As used herein, the original verbal form to which clitics attach is referred to as "clitic host" and the resulting form with the orthographic/phonological transformations as "clitic host variant."

For simple word breaking, if the desired output is only to break the different segments, dealing with clitics would appear to be quite easy. Just looking at the last letters of the words would be sufficient to determine whether a string is a verb-clitic form. However, this approach would mark as verb-clitic forms words that look like verb-clitic forms but are not. For example, the word ángeles could very well be taken for the Person 2 Singular Imperative Polite form of an inexistent verb *anger (with the needed accent added in the right position), but it is actually the plural of the noun ángel 'angel'. To solve this issue, a list of exceptions with all the known cases of false verb-clitic forms could be used. However, this solution would not prevent the treatment as verb-clitic forms of other words with similar characteristics that are unknown to the system.

In a word breaker scenario where the clitic host form has to be emitted, the computation needs to be more refined. When considering the spell checking scenario, it is obvious that low level solutions are not sufficient for the verb-clitic problem. Verbs with clitics are very common in the Spanish language and users expect spell checkers to be able to recognize them and offer appropriate suggestions when they contain an error.

Some Spellers are based on full form lexica: they list all the possible inflected forms for a given language. This way, if a string isn't found in the list, it is considered an error, and the entries from the lexicon with the smallest edit distance are offered as suggestions. Even though this is a good solution for a language with limited inflectional morphology, such as English, it poses significant problems for a highly inflectional language, such as Spanish.

As an example, one particular Spanish lexicon was found to contain around 13,400 verbs in their Infinitive base form, and there were found to be about 55 inflected forms for each verb. Therefore, without counting verb-clitic forms, a full form lexicon already needs to include around 737,000 inflected verbal forms. To recognize 240 verb-clitic forms per verb (adding over 3.2 million entries), the number of verbal forms alone would be too high (almost 4 million) to be effectively handled for these applications.

A variation of this methodology is to harvest the verb-clitic forms, i.e. to extract all the occurrences of verb-clitic forms from corpora and add only those to the list (instead of productively generating all the possible forms). This option has the shortcoming of providing little coverage for spell checking. Clitics are very frequent in Spanish; the user won't understand the inconsistency in their treatment.

The opposite solution to the use of full form lexica is to have a lexicon with only the lemmas. The lemmas can then be annotated with the morphological information needed to recognize all their inflected forms (including all the irregularities and orthographical changes for verbs, nouns, and adjectives). Note that clitics don't only attach to the Infinitive or base forms of the verbs, but also to inflected forms that can present lots of irregularities. For instance, while the 1$^{st}$ Person Imperative Plural form of subir 'to raise, to get on' is subamos, producing the verb-clitic form subámonos; the corresponding form of decir 'to say' is digamos, producing the verb-clitic form digámonos. This approach implies a big hit for runtime performance, especially for spell checking, where the goal is not only to recognize correct verb-clitic forms, but also to offer good suggestions for misspelled ones.

SUMMARY OF THE INVENTION

A computer-readable medium stores a first lexicon data structure for each of a plurality of lexicon words. The first lexicon data structure includes a host form variant field containing data representing a host form variant such as a clitic host form variant, a host form field containing data representing the host form of the host form variant (this field is only present if the forms differ) such as a clitic host verbal form, and a verification field containing data representing a property of the host form variant. The property is indicative of whether the host form variant is itself a valid word or whether the host form variant must be combined with another entry in the lexicon. Methods and apparatus using the data structure and the corresponding computer readable medium are also provided.

A further field of the first data structure can include a segment association field containing data or segmentation bits associating the host form variant for the host form word with certain types of attachment entries in the lexicon, which also contain data or segmentation bits, to define valid combinations between the host form variant and at least one of the attachment entries in the lexicon. The computer-readable medium also stores a second lexicon data structure for each of the attachment entries in the lexicon. In Spanish verb-clitic attachment analysis applications, the data contained in the host form word field of the first data structure can represent a verbal host form, with the data contained in the host form variant field of the first data structure representing the host form variant of the Spanish language verbal host form. The attachment entries in the lexicon would then include clitic attachment entries. In one exemplary embodiment, the attachment entries in the lexicon are clitic pair attachment entries in which each clitic pair is represented in the lexicon as a single unit, instead of as separate segments.

BRIEF DESCRIPTION OF THE DRAWINGS

FIG. 4 is a table presenting a full list of Spanish clitics.

FIG. 5 is a table presenting a full list of valid Spanish clitic pairs.

FIG. 6 is a table listing single clitics that can attach to each clitic host variant type.

FIG. 7 is a table listing clitic pairs that can attach to each clitic host variant type.

FIG. 8 is a table defining the segmentation bits by specifying which host form variant and clitic forms they apply to.

FIG. 9 is a table specifying which segmentation bits are assigned to each clitic form.

FIG. 10 is a table illustrating different types of host form variants, their corresponding host forms to be emitted for word breaking, and the related segmentation bits.

DETAILED DESCRIPTION OF ILLUSTRATIVE EMBODIMENTS

Compound word analysis, such as verb-clitic form analysis, is required for a variety of applications that involve natural language processing, for example: word breaking (for search engines), grammar checking, spell checking, handwriting-recognition, speech-recognition, machine translation, text mining, etc. Proofing tools represent important technologies in the editor market. More accurate analysis of verb-clitic forms and other compound words not only supports a more reliable and helpful spell checker, but also helps enhance grammar checkers.

Using the context of Spanish verb-clitic analysis as one of many possible applications, the present invention provides the opportunity for better coverage, accuracy, and speed than conventional systems, due to an annotation system that marks valid candidates and positions for possible combinations of verbal host forms (or other types of host forms) and clitic segments (or other types of segments or attachments), thus allowing for fast lookups rather than costly evaluations. The innovative approach provided by the present invention is a compromise between the traditional static approach of having a full form lexicon containing all possible word forms and the traditional dynamic approach of using a lexicon with only lemmas annotated with morphological information with runtime processing for handling inflected and complex word forms. The description of this invention will show how runtime-expensive technology can be used as a pre-processing tool in order to bootstrap relevant lexical annotations that allow high accuracy, coverage, and speed to be obtained for runtime verb-clitic form (or other complex word form) analysis.

Figure 1:
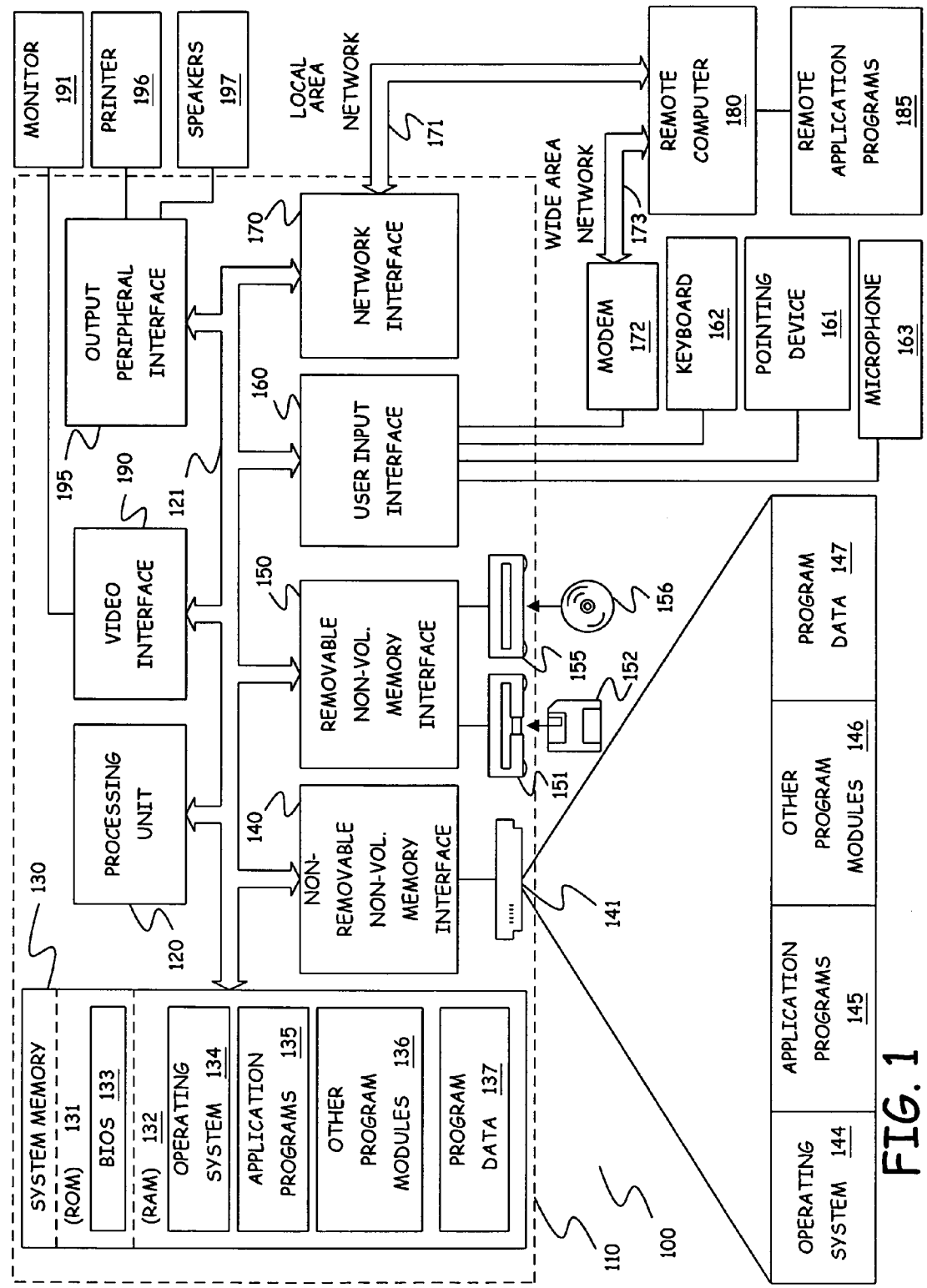
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
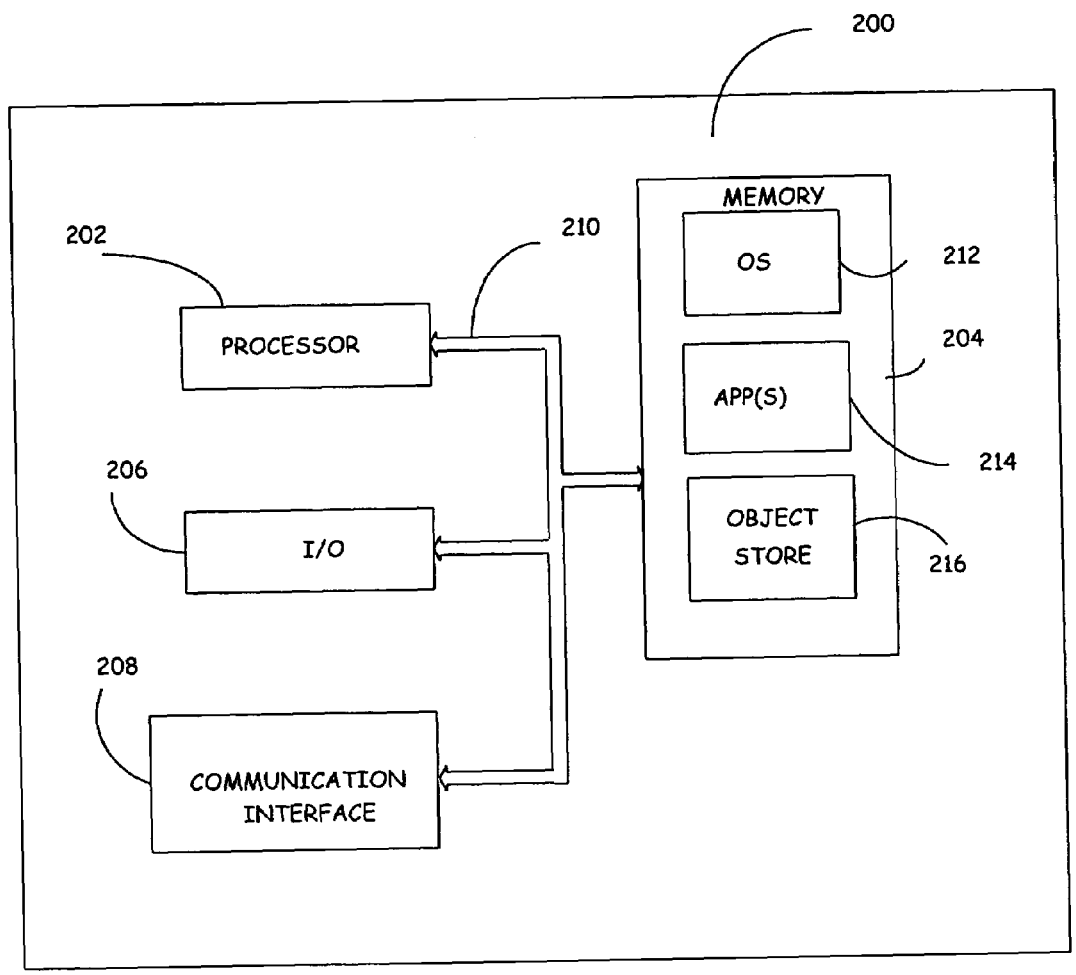
FIG. 2 is a block diagram of a general mobile computing environment in which the present invention may be practiced.

FIG. 2 is a block diagram of a mobile device 200, which is an alternative exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
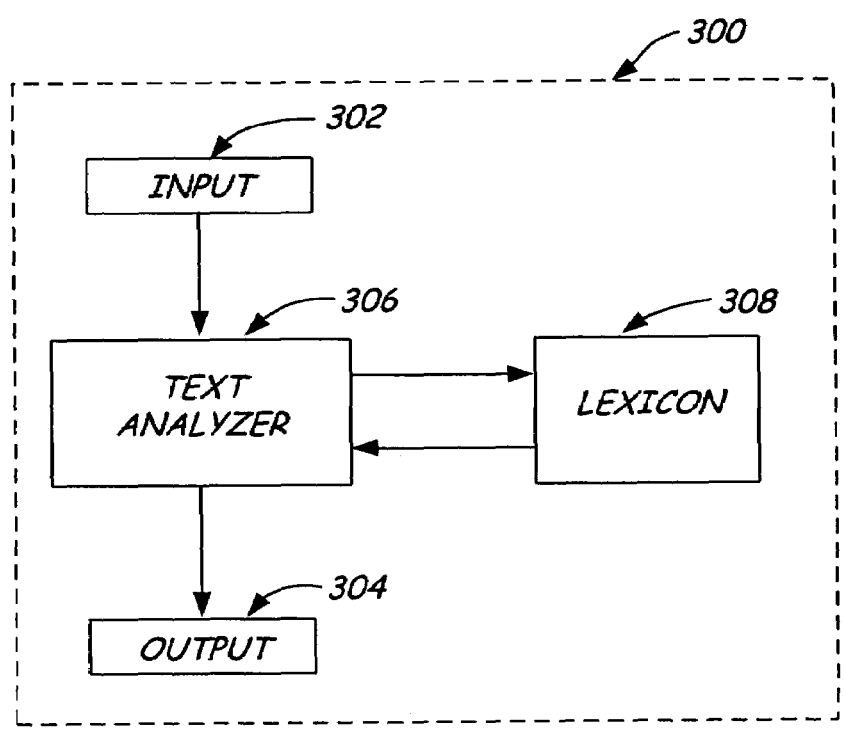
FIG. 3 is a block diagram of a language processing system accessing a lexicon of the present invention.

FIG. 3 generally illustrates language or text processing system 300 that receives language input 302, commonly in the form of a text string of one or more words, and processes the language input 302 to provide language output 304, also commonly in the form of a text string of one or more words. Language input 302 and output 304 can also be streaming lexical data, where processing system 300 quickly accesses information on lexicon 308 to generate output 304, such as in a speech recognition system.

Generally, language processing system 300 can be embodied as a word breaker (e.g. for a query system), spell checker, grammar checker, speech recognition system, handwriting recognition system, machine translation system, text mining system, or other language processing systems. As appreciated by those skilled in the art, language processing system 300 can be a stand-alone application, module, or component accessible by or included within another system.

Language processing system or application 300 includes text analyzer 306 and lexicon 308. Text analyzer 306 schematically represents components and/or modules that receive input 302, access and receive word information stored in lexicon 308, and process received word information to generate or provide output 304. One aspect of the present invention is an improved data structure for lexicon 308 so as to efficiently provide information to text analyzer 306 as required by a particular application.

It should be noted that lexicon 308 can be a separate component that can be used in multiple language processing systems and/or in conjunction with multiple text analyzers. Those skilled in the art can readily recognize how various text analyzers 306 can be adapted to lexicon 308. Lexicon 308 can also be made integral to a particular application or merely accessible to an application. Also, it is understood that text analyzer 306 can reside on computer 110 in FIG. 1, or any computer communicating with the computer 110, such as remote computer 180. Likewise, lexicon 308 can reside on computer 110 in any of the storage devices described above, or be accessible through a suitable communications link.

The data structures used in lexicon 308 can be represented in any of a wide range of desired formats. The layout or data structure of words entered into a lexicon of the present inventions, such as lexicon 308, is described in this document with reference to tables illustrating associated information. Generally, each entry or word stored in lexicon 308 has associated data fields. For an entry in the lexicon, the data fields which are relevant to the illustration of the concepts of the present invention are shown in particular Tables. These particular data fields are sometimes referred to as "dynamic segmentation bits" fields. In the context of the present invention, references to various data structure fields (i.e., a first field, a second field, etc.) is intended to also represent various individual bits of a single dynamic segmentation bits field. Further, it will be understood that the data structures will typically also include fields which are not needed to describe the aspects of the present invention, and which are therefore not referenced here.

The challenge of verb-clitic form analysis is to have a very vast and consistent coverage while finding a balance between runtime performance and workset size. It is important to recognize only the forms that have undergone the appropriate transformations. For spelling purposes, it is key to offer correct verb-clitic suggestions for misspelled forms. For word breaking purposes, the clitic host variant needs to be restored to its base form, so that it can be matched to other instances of the given verbal form.

Clitics in Spanish:

In general, clitic attachment can only occur in current common Spanish usage with the following verbal forms: Infinitive, Gerund, and five Imperative forms (six if voseo were to be included).

Infinitive (Infin)
Gerund (Gerund)
Imperative Pers2 Singular (P2 Sing)
Imperative Pers2 Singular Polite (P2 Pol Sing)
Imperative Pers1 Plural (P1 Plur)
Imperative Pers2 Plural (P2 Plur)
Imperative Pers2 Plural Polite (P2 Pol Plur)

For purposes of discussion, the system described does not recognize the voseo imperative forms used in the Argentinean dialect, which also undergo clitic attachment. Including them significantly increases the level of complexity of the system.

In addition, including the voseo imperative forms would potentially mask a large number of errors when spell checking. However, the concepts of the present invention are extendable to systems which do recognize the voseo imperative forms.

The list of clitics in Spanish is provided in Table 1 shown in FIG. 4. Note that "se" appears both in the singular and plural columns of the second and third persons because it can function as a clitic for both persons and numbers. However, from now on in this document, the clitic "se" is included only once, no matter what person and number it may represent. The total number of distinct single clitics is eleven.

Clitics usually appear either in single units or in pairs. Some combinations of clitics are not possible. In one embodiment provided for illustrative purposes, the systems and methods of the present invention are configured to cover the 36 clitic pairs illustrated in Table 2 shown in FIG. 5. In Table 2, the slots containing a hyphen represent invalid clitic combinations.

Although some three-clitic combinations, such as in the forms "cómetemelo", "dártemelo", and "dátemelo", could be found in some contexts, they appear to be extremely rare and will not be included in the standard Natural Language Group (NLG) Spanish verb-clitic coverage. However, in other embodiments, the treatment of more than two clitics is possible, and the methods of the present invention can be extended to provide such coverage. The most common cases may be covered via lexicalization (i.e., added to the lexicon as a single unit entry instead of as a clitic host variant annotated to reference its clitics combinations).

Not all single clitics and clitic pairs combine with all possible clitic host forms. Thus, in one embodiment provided for illustrative purposes, making abstraction of certain properties of the verbal host forms, we arrive at a total number of 240 valid verb-clitic forms per verb.

Verb-clitic segmentation:

The segmentation method of the present invention treats some of the full form lexicon entries as strings that are concatenated to create more complex forms. Even though a form created by the attachment of a verb and two clitics is linguistically a combination of three words, for pragmatic reasons some embodiments of the algorithm or method of the present invention handle all verb-clitic forms as pairs of strings. Therefore, it treats combinations of two clitics as one entry in the full form lexicon, and refers to them as "clitic pairs." Conventionally, linguistic analysis breaks down clitic pairs into their constituent single clitics, which requires complex logic to establish how those pairs combine together and with clitic host variants. One aspect of the invention improves on this by adding the clitic pairs as single entries into the lexicon, and annotating how those pairs combine with clitic host variants. By treating clitic pairs as one single segment or unit in the lexicon, tagging logic required in the prior art is reduced or minimized. Thus, this aspect of the invention minimizes run-time processing requirements without increasing the size of the lexicon by a large number of entries.

Thus, the segmentation algorithm operates only on two segments: an initial segment and a final segment. The first segment is an orthographic/phonological variant of the host form. If the final segment is a clitic pair, it can be segmented into two pieces for word breaking using information on the word break location stored in the full form lexicon (e.g. sete Segs=2 which indicates that the word break location is found after the first two characters "se"; and noslo Segs=3 which indicates that the word break location is found after the first three characters "nos").

In an embodiment of the present invention, the algorithm uses three kinds or types of bits to annotate the verb-clitic form segments:
one bit to mark final segments (currently, this is referred to as the Seg3bit),
10 bits to license the attachment of the appropriate clitics to each class of clitic host variants, and
one bit to mark as DoNotVerify the subset of forms that can't appear alone.

The algorithm to combine the forms is as follows:
the first segment must not have the Final bit (Seg3 bit) and the second segment must have the Final bit; AND
the first and the second segments must share at least one of the 10 possible clitic class bits.

The DoNotVerify bit of the Dynamic Segmentation Bits Field (or alternatively referred to as the DoNotVerify field of the Dynamic Segmentation Bits Fields) is very important for spell checking. In some cases, clitic host variants that differ from their clitic hosts (by addition of an accent or deletion of the last letter) coincide with other inflections of the same verb, but usually they are not valid stand-alone words. Therefore, the latter forms, which are only used for verb-clitic form analysis, need to be marked as errors when standing alone and can't be offered as suggestions. This represents another aspect of the present invention.

To expand upon this aspect of the present invention, it was illustrated above that some of the verb host forms that can connect with clitics undergo some change (gain an accent, move an accent, drop a letter, etc) in the generation of the host variant, and without the clitic they would not be valid stand alone words or forms in a dictionary. In some embodiments of the invention, those forms are added to the lexicon such that they can be found as a possible segment in a verb-clitic compound, but marked using the "DoNotVerify" bit as a form that must be combined with a clitic to be valid. Thus, a spell checker using the lexicon would recognize that these forms aren't valid stand alone words, and stand alone use would be flagged as a spelling error. In this manner, static information is added as necessary to the lexicon, and a tagging system is provided which licenses the valid combinations. This reduces the amount of dynamic reasoning at runtime, without significantly increasing the size of the lexicon.

Examples of this concept are readily seen. For example, the Spanish infinitive verb "comer" combines with the clitic "lo" to form the verb-clitic word "comerlo." In this instance, the original verb form "comer" does not change. However, in contrast, when the Spanish inflected verb form "toma" combines with the clitic "lo", it takes an accent mark to form the verb-clitic form "tómalo". As another example, when the Spanish word "mirad" combines with the clitic "os" and the clitic "lo" to form the word "miráoslo", the final consonant of "mirad" is deleted and an accent is added to obtain the verb form "mirá". Neither "tóma" nor "mirá" are valid word forms outside of their combination with a clitic. In accordance with the present invention, these verb forms or clitic host variants are included in the lexicon, but are marked or designated as forms that are only valid in correct uses with clitics, but not as stand alone words.

As we mention above, the desired output for word breaking includes emission of the clitic host form. Each clitic host form can have several clitic host variants, which combine with different sets of clitics. Therefore, the Seg bits are assigned to clitic host variants. When clitic host variants differ from their clitic host forms, the former are annotated with a Baseform field containing their clitic host form.

Table 3 shown in FIG. 6 lists all the single clitics that can attach to each clitic host variant type. In the table, the various forms of the verb peinar 'to comb' are used to provide an example of each type. Table 4 shown in FIG. 7 lists all the clitic pairs to be recognized for every host form variant. The table rows are grouped by the clitic (first column) starting the clitic pair combination.

Verb-clitic form lexicalization:

In accordance with some aspects of the present invention, not all verb-clitic attachments are handled via segmentation. For different reasons (conflict with another inflected verbal form, irregular inflection pattern, etc.), some of the forms are treated as lexicalized entries to the lexicon. In such cases, the whole verb-clitic form string is included in the full form lexicon. These are treated as regular entries by the spell checker. However, for word breaking, they are annotated with the clitic host and information about the length of the segments, so that the output is the same as for cases treated by segmentation. Consider the following example (note, the Seg bits referred to in this example are defined in Tables 5 and 6 described below, and further discussed in Tables 7 and 8 also described below):

Segments in the Lexicon:
    cántalo 'sing it':
        Entries in full form lexicon:
            "cánta" (annotated with host form "canta" and bits Seg4 and DoNotVerify),
            "lo" (annotated with bits Seg1 Seg4 Seg5 Seg6 Seg8 and Seg3)
        Output for word breaking:
            cántalo,
            cánta,
            canta,
            lo Lexicalized Full Verb-clitic Form in the Lexicon:
    cantaos 'sing to yourselves':
        Entry in full form lexicon:
            "cantaos" (annotated with host form "cantad" and first segment length "5")
        Output for word breaking:
            cantaos,
            canta,
            cantad,
            lo For lexicalized forms, the DoNotVerify bit is not applicable. They are annotated with information about the length of the segments and their base form. This is how the entries for the lexicalized verb-clitic forms cantaos 'sing to yourselves', uníosle 'join him', prevelo 'foresee it', and póntelo 'put it on' will be entered in the full form lexicon:

cantaos Segs=5 Baseform=cantad
    uniosle Segs=3,2 Baseform=unid
    prevelo Segs=5 Baseform=prevé
    póntelo Segs=3,2 Baseform=pon Another way of considering lexicalized forms or lexicalized entries is to define them as an entry of the type which would ordinarily participate in this process (verbal forms+ clitics or clitic pairs), but which is added to the lexicon as a single entry or unit instead of as a clitic host variant annotated for its clitic combination. The main objective of this invention is to avoid putting the full forms of verb-clitic combinations in the lexicon, thus significantly reducing the lexicon size. However, there are some special cases that, when treated as lexicalized entries, greatly reduce the run-time processing.

In the case of the four cases of lexicalized verb-clitic forms shown above, they are lexicalized because either some conflict with an existing verbal form or some irregularity in the form of the word makes it more efficient to do so. For purposes of spell checking, the lexicalized entries are all that is needed because they appear in the lexicon just as they would appear in input text. For purposes of word breaking, they have to be annotated with (1) information on where to segment; and (2) what baseform to return. For example, consider the fourth lexicalized entry "póntelo". It has three segments "pon" "te" and "lo". "Póntelo" is lexicalized and annotated with a Segs entry Segs=3,2. This means, to segment the form, divide it after the third character (i.e., to obtain "pon"), and then divide it again two characters later (i.e., to obtain "te" and "lo"). It is also annotated with the baseform word "pon" (without the accent mark), which is the standard form of this clitic host. This is a case of linguistic exception handling.

One of the reasons for the lexicalizations is the intent to use the same full form lexicon for other applications. Lemma is another piece of information that one would want to extract from the lexicon entries. In order to keep the full form lexicon at a manageable size, and to avoid wrong interactions between clitic host variant forms and lemmas, lexicalization is used to handle all the cases where the clitic host variant differs from the clitic host but coincides with a correct inflection of the verb.

A class of cases treated by lexicalization, of which the previously discussed "póntelo" is an example, is that of some irregular Imperative forms which don't follow the general rules for the placement of the accent mark when combined with clitics.

E.g.:
    monosyllabic:
        ten, tenlo, ténmelo 'have, have it, have it for me'
    accent in the last syllable:
        propón, proponlo, propónmelo 'propose, propose it, propose it to me'

Since the number of such forms is small, the whole string of these verb-clitic forms is listed in the full form lexicon rather than creating new classes and bits to account for them.

Segmentation Bits:

In an embodiment of the present invention for Spanish verb-clitic attachment analysis, 10 Seg bits are used along with the DoNotVerify bit. These 10 Seg bits are also part of the Dynamic Segmentation Bits Field. The maximum number of Seg bits per entry is 6 or 7 if counting the DoNotVerify bit. Note that this maximum appears only in clitics and clitic pairs, which are a small set of 47 entries. The maximum number of Seg bits per clitic host variant, which are counted by the thousands, is only 2, or 3 if counting the DoNotVerify bit.

Table 5 shown in FIG. 8 explains all the bits used to categorize all clitic host variants and clitic forms. They are grouped in three bit classes. "Clitic class" bits differentiate among the sets of clitics that combine with each clitic host variant. The "Applies to" column of Table 5 relates or associates the clitic classes to types of host form variants. Examples (e.g., cantar and cantándo) are also provided, though the classifications are not limited to these examples. The other two classes, "Final Segment" and DoNotVerify" contain only one bit, as presented in the table. Table 6 shown in FIG. 9 illustrates the bits assigned to single clitics and clitic pairs. Note that some of the double clitic forms in the table will also need to carry the DoNotVerify bit, even though this bit is not illustrated in Table 6. It must also be noted that the names of these bits (or fields or properties) are not of particular relevance. Instead, the names provided (e.g., Seg1) are just examples, and can be replaced with other names.

As can be seen in Tables 5 and 6, the Seg9 bit applies only to the single clitic "os" and a small number of clitic host variants that very often coincide with other valid inflected verb forms. In one embodiment provided for illustrative purposes, these verb-clitic forms were lexicalized in order to avoid the ambiguity between clitic host variants and other inflected forms. This is marked in the table with an asterisk.

Verbal Classes:

In Spanish, there are three main verbal inflectional classes: verbs ending in -ar, -er and -ir. Although linguistically treated as part of the -ir class, for the purpose of verb-clitic form analysis, verbs ending in -ir are considered a separate class due to their different accentuation patterns.

Given the above set of bits, Table 7 shown in FIG. 10 presents all the clitic host form variants needed to fully illustrate each of the above verb classes and their bits. The table includes also the host forms which are to be emitted for word breaking for each of the host form variants. For most verbs, it is necessary to add nine DoNotVerify clitic host variants to the full form lexicon. For some, fewer DoNotVerify lexicon entries are needed.

As discussed previously, clitic host variants which are marked with an * symbol in Table 7 will not appear as separate entries in the full form lexicon to avoid having clitic host variants that are equal to other valid stand-alone inflected verbal forms. Instead, these forms will appear lexicalized as verb-clitic forms in the lexicon.

Building the Full Form Lexicon

Figure 11:
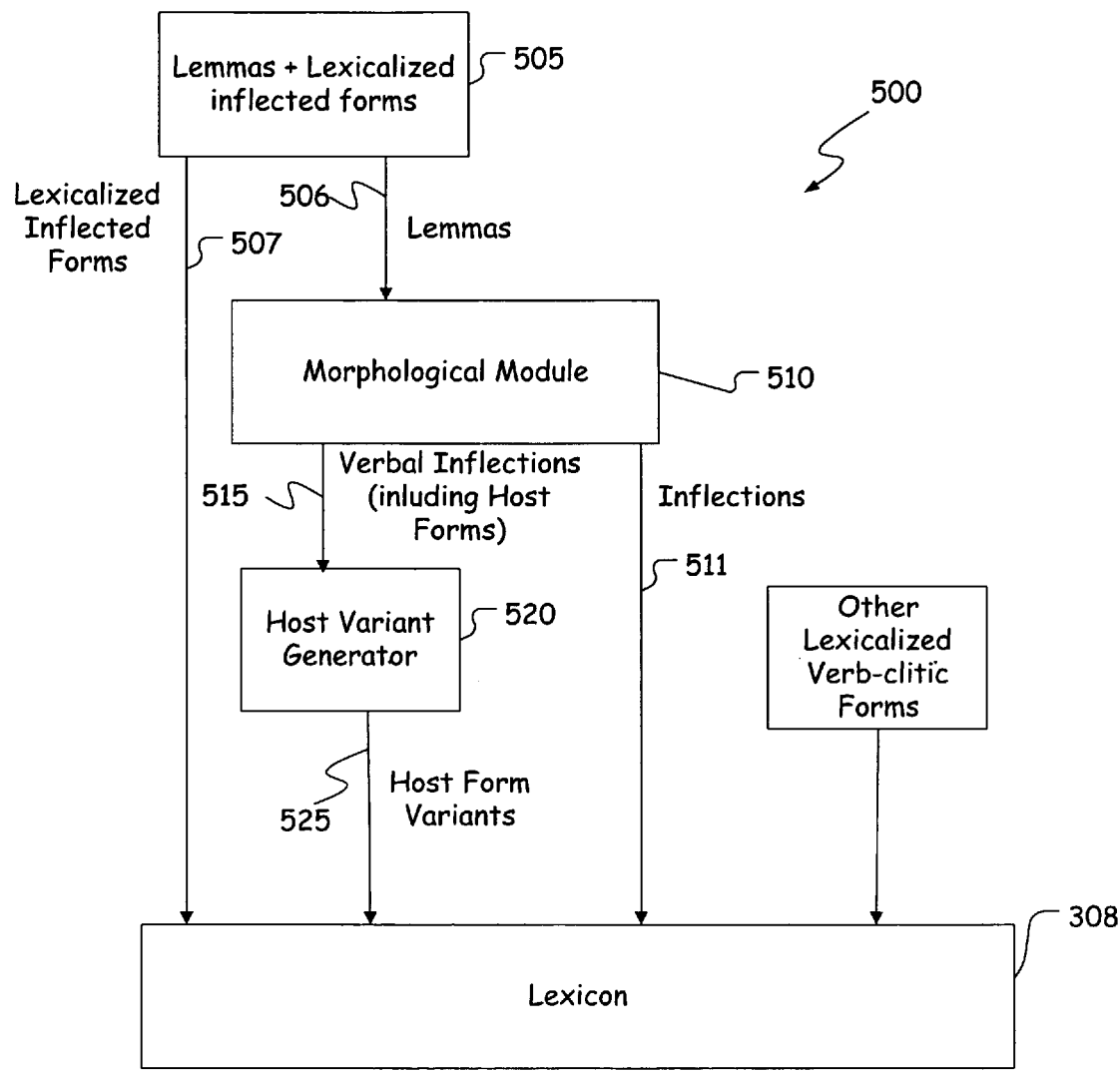
FIG. 11 is a block diagram illustrating a system which builds a full form lexicon of the present invention.

FIG. 11 illustrates a system 500 which builds the full form lexicon having data structures as described above and in the Tables. A morphological module 510 based on a finite state transducer is used to generate the inflected forms 515 (including the "Host Forms" as shown in Table 7) from the verbal lemmas just as is done for nouns and adjectives. In one exemplary embodiment, all of the inflected forms are not generated. In this embodiment, some forms that are highly irregular are listed with the lemmas in the database or source lexicon. The "Host Forms" are actually only a subset of the verbal inflected forms. This output 515 is fed into a Clitic Host Variant Generator 520 (which can be other types of Host Variant Generator in other embodiments). Generator 520 applies the appropriate transformations as described above to the clitic host forms, as needed, to create the clitic host variants 525 shown in the third column of Table 7 (or other types of host form variants for other embodiments). For example, it generates the Host Variants having addition or deletion of an accent mark, deletion of a final consonant, etc. Generator 520 annotates the resulting forms with the corresponding segmentation bits and the DoNotVerify bit as applicable. It also produces the lexicalized verb-clitic forms for Seg9 clitic host variants discussed above and annotates them with information on segment length and base form. The host form variants 525, and corresponding annotations, are then stored in lexicon 308.

The lemmas 506 used by the morphological module 510 come from a database 505 of lemmas that also include some lexicalized irregular forms (as well as prepositions and adverbs which don't inflect). These forms 507 go directly to the lexicon 308. The morphological module 510 also produces inflections 511 for nouns and adjectives, which also go directly to the lexicon 308. Not all the inflected verbal forms are transformed in the Host Variant Generator. Most of them are included into lexicon 308 without further alternation.

Some of the clitic host forms are too irregular to be generated by means of a morphological process. Since this is not a long list, their correspondent clitic host variants and lexicalized verb-clitic forms can be generated by hand. This list, as well as the list of clitics and clitic pairs, is added to the full form lexicon as well.

Verb-clitic form candidate

For performance's sake, it is not necessary to consider all forms for verb-clitic analysis. For example, the system can identify possible candidates using a test on the length of the form. In one embodiment, to be a verb-clitic candidate, the form must be between 4 and 19 characters in length. Other length ranges can be used as well. More complex candidate filtering techniques can also be used.

Example Text Analyzer Systems

Figure 12:
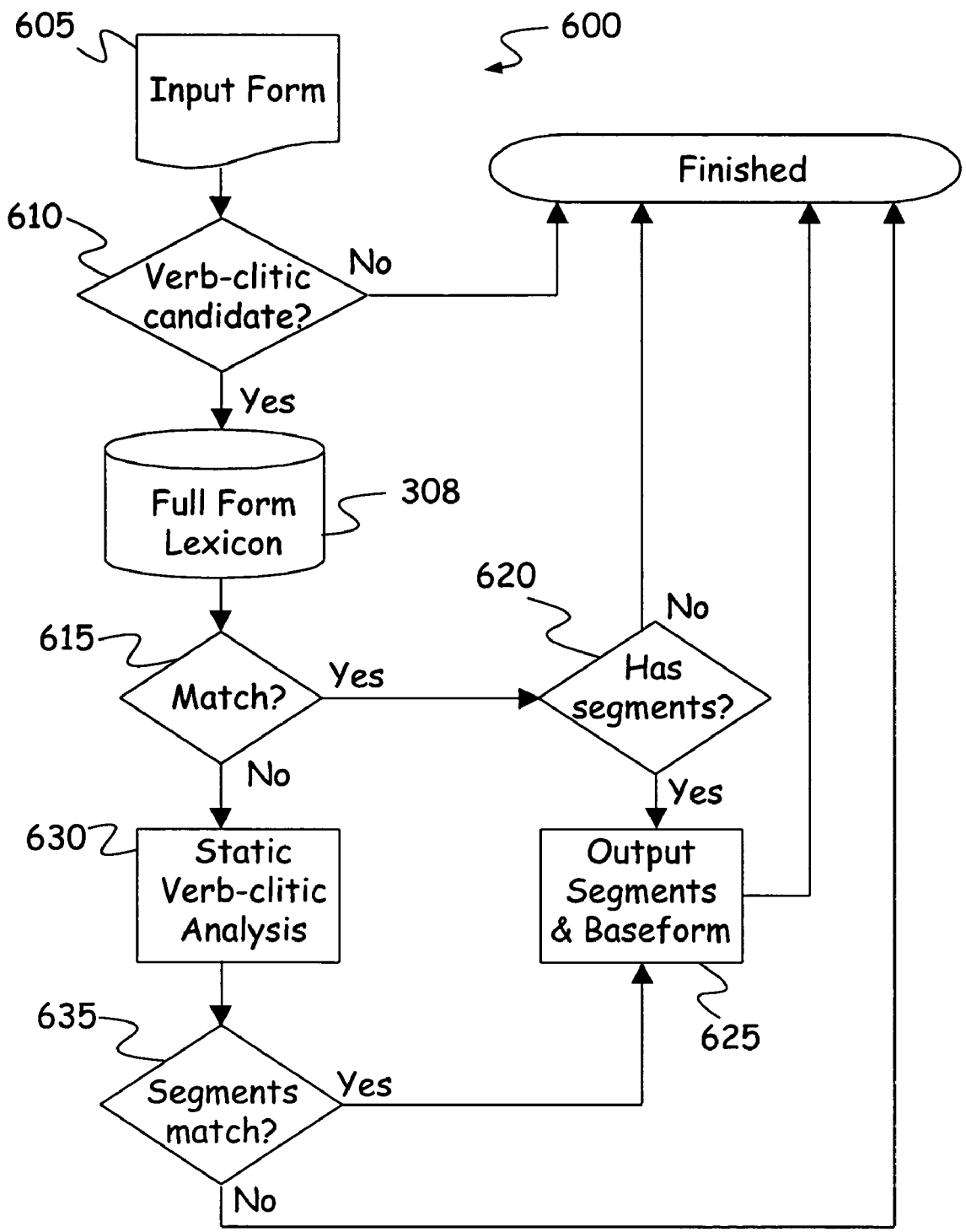
FIG. 12 is a block diagram illustrating a word breaking system or method which utilizes static verb-clitic analysis techniques of the present invention.

Referring now to FIG. 12, shown is method and system 600 for performing static verb-clitic form analysis in a word breaker scenario. This system can be implemented, for example, in text analyzer 306 shown in FIG. 3. Given an input string or form 605, the task is to see if it is a possible verb-clitic combination, and if it is, then to output the segments of that verb-clitic combination. At decision point or component 610, a verb-clitic candidate screening test is performed. As discussed above, in some embodiments, the test is a string or form length test. For example, anything between 4 and 19 characters in length is considered as a potential verb-clitic candidate. Again, different length ranges are possible in other embodiments. Also, this test can be based on criteria other than length in other embodiments.

If the input form is determined at 610 to not be a verb-clitic candidate, then the analysis ends. If the input form passes the candidate test at 610, it is checked at step or component 615 for matches with entries in the full form lexicon 308. If there is a complete match with an entry in the full form lexicon, at step or component 620 a determination is made as to whether the match has segments. If the match has segments (i.e., one or more of the Segs= or breaking point attributes discussed above has a value), then it is one of the lexicalized verb-clitic words, and at step or component 625, the segments and baseform of that match are output. If at 620 it is found that the Segs= attribute is empty (i.e., doesn't have a value) or is absent, then there are no known segments, and the input form is not a verb-clitic word.

If at 615 it is determined that no match exists in the lexicon, the input form is provided to a static verb-clitic analysis algorithm or component 630. This algorithm or component implements the segment checking aspects of the invention described above to see if the input form is a valid verb-clitic form or word. If there are two entries in the full form lexicon that concatenated match the input string and these entries have matching segment attributes (i.e., the Segment types match and the final segment has a Seg3 attribute and the first segment does not) as determined at decision point or component 635, then the segments and the baseform are output and the analysis is complete. If the segments don't match, the analysis ends and the input form is not considered a verb-clitic form for word breaking purposes.

Figure 13:
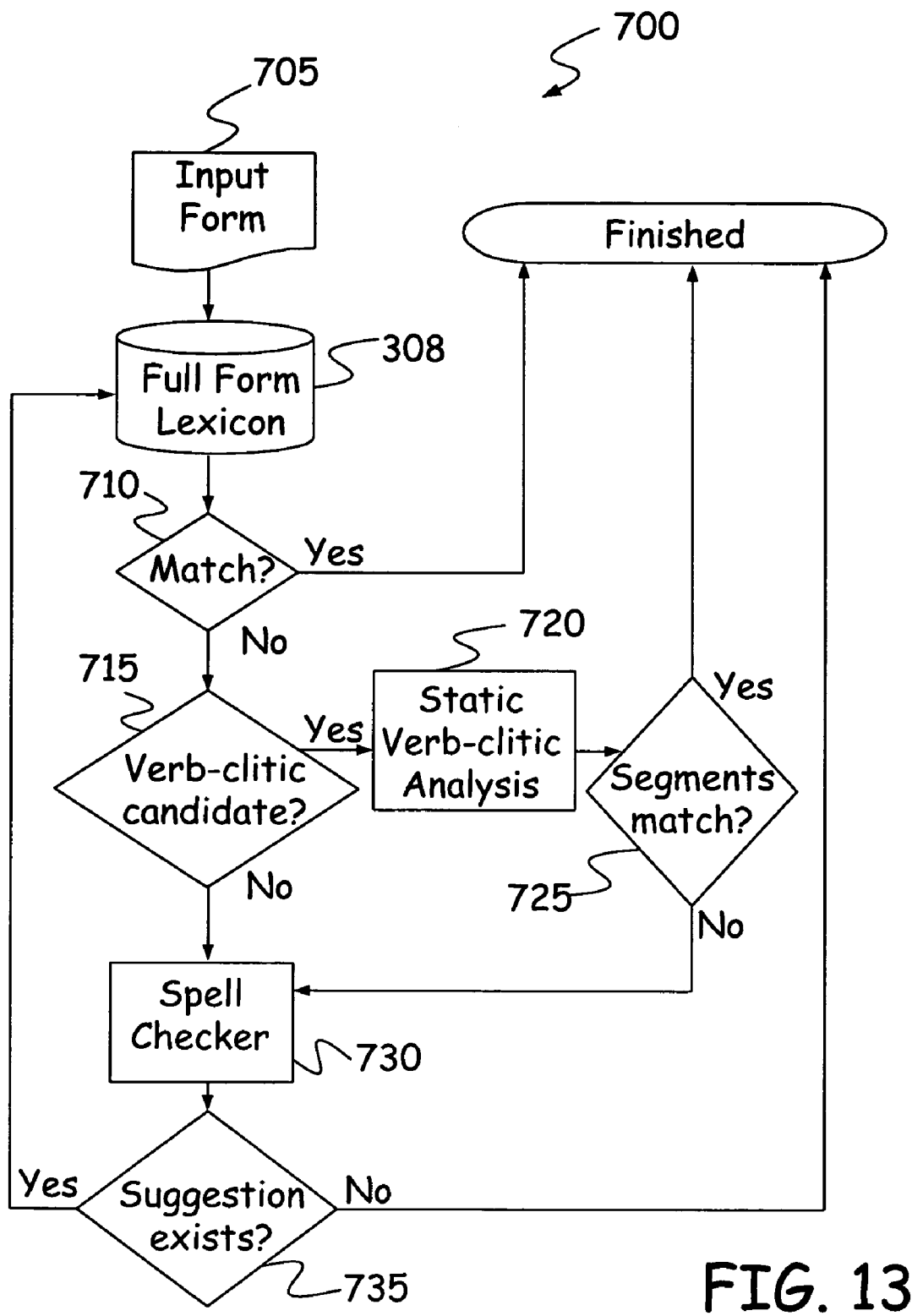
FIG. 13 is a block diagram illustrating a spell checking system or method which utilizes static verb-clitic analysis techniques of the present invention.

Referring now to FIG. 13, shown is method and system 700 for performing static verb-clitic form analysis in a spell checker scenario. This system can also be implemented, for example, in text analyzer 306 shown in FIG. 3. Given an input string or form 705, it is compared to entries in the full form lexicon 308 to see whether a match exists. If at decision point or component 710 it is determined that there does exist a match of the input form with an entry in the full form lexicon, then the input form is spelled correctly and the analysis is completed. The input form could be a noun or other words found in the lexicon, or it could be a verb-clitic form which has been lexicalized.

If at 710 it is determined that no match exists in the lexicon, then at decision point or component 715, a verb-clitic candidate screening test is performed. As discussed above with reference to the word breaker scenario, this test can be a form length test. For example, anything between 4 and 19 characters in length is considered as a potential verb-clitic candidate. In this event, the input form is provided to a static verb-clitic analysis algorithm or component 720 which is similar or identical to component 630 shown in FIG. 12. This algorithm or component implements the segment checking aspects of the invention described above to see if the input form is a valid verb-clitic form or word. If there are two entries in the full form lexicon that concatenated match the input string and these entries have matching segment attributes (i.e., the Segment types match and the final segment has a Seg3 attribute and the first segment does not) as determined at decision point or component 725, then the input form 705 is recognized as a valid verb-clitic form, and it passes the spell check. If the segments don't match at 725, or if the input form fails the verb-clitic candidate test at 715, then the input form goes to the spell checker module or component 730. The spell checker 730 attempts to make suggestions for misspellings (using editing distance or other algorithms). If it can't make a suggestion as determined at decision point or component 735, the analysis is complete and the input form is flagged as being misspelled, but without recommended corrections. If the spell checker can make a suggestion, the suggestions must be checked again through the full form lexicon and it repeats through another iteration.

As an example, if the input form was "cantandome", it would be a misspelled verb-clitic form since the only host variant form of the host form "cantando" is "cantándo". In other words, it is missing the accent, which is a very common type of misspelling in Spanish. The spell checker 730 would suggest adding an accent to that form. Then the process is repeated and it is found that the suggested correction is made up of two valid segments and that the segments satisfy the matching requirements.

Although the present invention has been described with reference to particular embodiments, workers skilled in the art will recognize that changes may be made in form and detail without departing from the spirit and scope of the invention.

What is claimed is:

1. A method of annotating verb-clitic form segments in a lexicon, the method comprising:
    defining, for a segment which is a clitic pair form segment, final segment data indicative of whether the segment must appear in a final position of any verb-clitic words formed using the segment;
    annotating the segment using the defined final segment data;
    defining, for the segment, segment association data indicative of valid combinations of the segment with other types of segments to form verb-clitic words;
    annotating the segment using the segment association data;
    defining, for the segment, word break data indicative of a word break location in the clitic pair form segment; and
    annotating the segment using the word break data.

2. The method of claim 1, wherein the step of defining segment association data further comprises defining the segment association data such that it is indicative of classes of clitic hosts variants to which the clitic pair form segment can appropriately be attached.

3. A method of combining first and second verb-clitic form segments from a lexicon to form a verb-clitic word, the method comprising:
    determining whether absence of final segment data associated with the first verb-clitic form segment indicates that the first verb-clitic form segment cannot be a final segment of the verb-clitic word;
    determining whether final segment data associated with the second verb-clitic form segment indicates that the second verb-clitic form segment must be the final segment of the verb-clitic word; and
    combining the first and second verb-clitic form segments from the lexicon to form the verb-clitic word only if it is determined that the first verb-clitic form segment cannot be the final segment and that the second verb-clitic form segment must be the final segment.

4. The method of claim 3, and further comprising:
    determining from clitic class data associated with the respective first and second verb-clitic form segments whether the first and second verb-clitic form segments share at least one of a plurality of different clitic class associations; and
    combining the first and second verb-clitic form segments from the lexicon to form the verb-clitic word only if it is determined that the first and second verb-clitic form segments share at least one of the plurality of different clitic class associations.

5. A tangible computer storage medium having stored thereon computer readable instructions for performing steps of a method of annotating verb-clitic form segments in a lexicon, comprising:
    defining, for a segment which is a clitic host variant, final segment data indicative of whether the segment must appear in a final position of any verb-clitic words formed using the segment;
    annotating the segment using the defined final segment data;
    defining, for the segment, segment association data indicative of valid combinations of the segment with other types of segments to form verb-clitic words;
    annotating the segment using the segment association data;
    defining, for the segment, verification data indicative of whether the clitic host variant must be combined with a clitic segment to form a valid word; and
    annotating the segment using the verification data.

6. The tangible computer storage medium of claim 5, and wherein the step of defining segment association data further comprises defining the segment association data such that it is indicative of classes of clitic hosts variants to which the clitic form segment can appropriately be attached.

* * * * *

UNITED STATES PATENT AND TRADEMARK OFFICE
CERTIFICATE OF CORRECTION

| | | |
|---|---|---|
| PATENT NO. | : 7,398,210 B2 | Page 1 of 1 |
| APPLICATION NO. | : 10/804883 | |
| DATED | : July 8, 2008 | |
| INVENTOR(S) | : Rene J. Valdes et al. | |

It is certified that error appears in the above-identified patent and that said Letters Patent is hereby corrected as shown below:

In column 1, line 13, delete "applications." and insert -- applications: --, therefor.

In column 16, line 54, in Claim 6, after "claim 5," delete "and".

Signed and Sealed this

Nineteenth Day of April, 2011

David J. Kappos
*Director of the United States Patent and Trademark Office*